United States Patent
Pillkahn et al.

(10) Patent No.: US 9,487,844 B2
(45) Date of Patent: Nov. 8, 2016

(54) METHOD FOR DETACHING COATINGS FROM SCRAP

(75) Inventors: Hans-Bernd Pillkahn, Werdohl (DE); Thomas Kamper, Burgwedel (DE); Holger Ververs, Castrop-Rauxel (DE)

(73) Assignee: ProASSORT GmbH, Werdohl (DE)

( * ) Notice: Subject to any disclaimer, the term of this patent is extended or adjusted under 35 U.S.C. 154(b) by 234 days.

(21) Appl. No.: 13/261,715

(22) PCT Filed: Feb. 16, 2012

(86) PCT No.: PCT/EP2012/000683
§ 371 (c)(1),
(2), (4) Date: Oct. 22, 2013

(87) PCT Pub. No.: WO2012/110239
PCT Pub. Date: Aug. 23, 2012

(65) Prior Publication Data
US 2014/0034090 A1    Feb. 6, 2014

(30) Foreign Application Priority Data

Feb. 17, 2011   (DE) .......................... 10 2011 011 532

(51) Int. Cl.
*C22B 1/00*    (2006.01)
*C22B 7/00*    (2006.01)
*C23F 1/02*    (2006.01)

(52) U.S. Cl.
CPC .............. *C22B 1/005* (2013.01); *C22B 7/006* (2013.01); *C22B 7/007* (2013.01); *C22B 7/008* (2013.01); *C23F 1/02* (2013.01); *Y02P 10/212* (2015.11)

(58) Field of Classification Search
CPC ..... C22B 1/005; C22B 21/005; C22B 7/007; C22B 7/008
See application file for complete search history.

(56) References Cited

U.S. PATENT DOCUMENTS

| | | | | |
|---|---|---|---|---|
| 2,887,826 A | * | 5/1959 | Schultz | 451/80 |
| 3,905,882 A | * | 9/1975 | Hudson et al. | 205/607 |
| 4,147,531 A | * | 4/1979 | Miller | 75/687 |
| 5,085,999 A | * | 2/1992 | Bowers-Irons | B08B 7/00 134/38 |
| 5,779,878 A | * | 7/1998 | Morgan et al. | 205/657 |

FOREIGN PATENT DOCUMENTS

DE    102004028496 B3 * 11/2005

OTHER PUBLICATIONS

Machine translation of DE 102004028496; Oertel, D., 2005.*

* cited by examiner

*Primary Examiner* — Michael Kornakov
*Assistant Examiner* — Natasha Campbell
(74) *Attorney, Agent, or Firm* — Berliner & Associates

(57) ABSTRACT

The invention relates to a method for the removal of coatings from scrap materials (3), wherein the scrap (3) is brought into contact with a liquid and, while the coating removal process is performed, moves within a conveying trough (2) of a vibrating conveyor (1) in a direction (6) from the inlet end (7) towards the outlet end (8) of said conveying trough (2). The invention is of special importance for the dezincing of steel scrap. The method operates on a continuous basis with the removal of coatings being efficiently accomplished.

9 Claims, 3 Drawing Sheets

METHOD FOR DETACHING COATINGS FROM SCRAP

Figure 1:
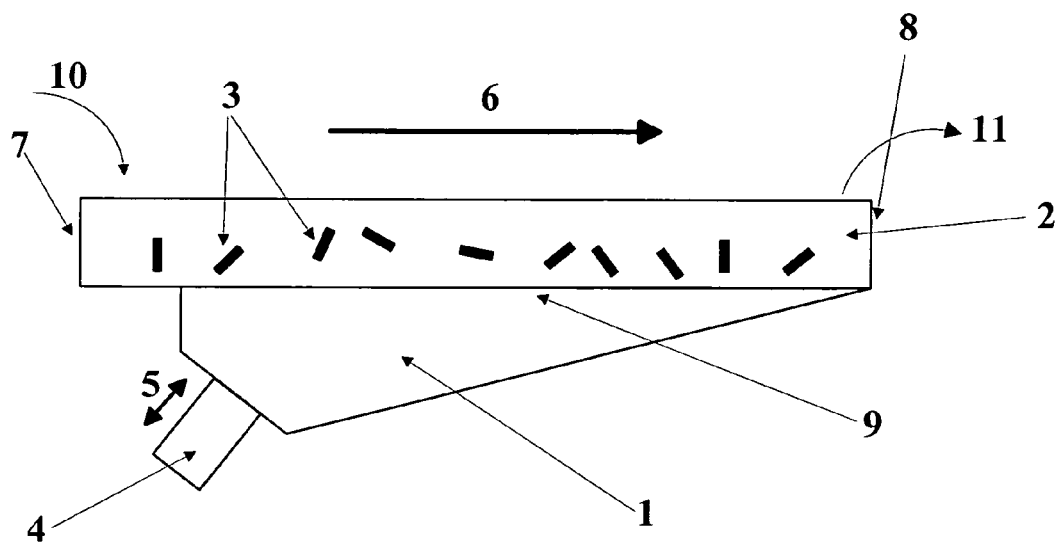

The invention relates to a method for the removal of coatings from scrap material, wherein scrap is brought into contact with a liquid.

Scrap, in particular steel scrap, is often provided with a coating that serves as a protection against corrosion or is intended to produce special physical and visual surface effects. The products from which the scrap stems after use may, for example, have been coated electrolytically, by a hot dipping process or cladding with a layer of other metals and/or treated with organic compounds, for example may be provided with a paint coat, varnish or film laminate. To a particularly large extent steel is provided with a zinc coat as a protection against corrosion so that significant amounts of zinc-plated steel scrap arise. The only economically feasible way of disposing and recycling such a kind of hybrid material has been remelting the scrap in the electric arc furnace or in foundry furnaces, here preferably in cupola furnaces. All these processes, however, are suboptimal both from an economical and from an ecological viewpoint because when remelting zinc-coated steel scrap large amounts of zinc-containing dust will arise for example. When disposing of this dust material on dumpsites major amounts of valuable metal are lost. Although processes are known by means of which this dust can be recycled pyrometallurgically said processes, however, are by comparison uneconomical as well because metal losses are high and they are also questionable from an environmental point of view. Moreover, due to the fact that zinc is a raw material of significant value a prior, i.e. before scrap remelting takes place, recovery of zinc from the zinc-coated steel scrap is to be viewed expedient also as far as economic aspects are concerned.

Methods for the dezincing of steel scrap in an alkaline solution have been known from prior art. Drawback of such processes is however that the dezincing operation requires a significantly increased temperature in the range of at least 85° C. for a relatively long period of time. Aside from basic dezincing the acidic dezincing of steel scrap has also been known which is performed at lower temperatures within a shorter time period. In the past, said acidic dezincing method could not win recognition however because treatment with acid always led to significant amounts of iron entering the solution as well. The German patent application DE 10 2008 016 323 A1 has therefore proposed to employ a zinc ion laden solution for the purpose of dezincing steel scrap in an acidic solution. This proposal was based on findings that the presence of zinc ions in the acidic solution led to a considerably accelerated zinc dissolution resulting in the time of contact with the steel scrap material to be dezinced to be minimized to such an extent that the iron dissolution had only just begun. In comparison, the use of pure acid only enabled incomplete dezincing results to be achieved with the reaction times being identical. Therefore, the longer reaction times necessary to achieve almost complete dezincing results lead however to the undesirable dissolution of iron increasing considerably. Also known from publication DE 10 2008 048 493 A1 is that the dissolution of iron is inhibited in the event the conversion with acidic solution is brought about in the presence of oil.

If such a dezincing process is performed great care must be taken to precisely monitor the reaction times in order to keep said undesirable dissolution of iron within acceptable limits. This can be done by an intermittently operating batch process but using a continuous process surely offers advantages in that it basically enables a higher throughput to be achieved. It is thus the objective of the invention to provide a method for the removal of coatings from scrap material, wherein the scrap is brought into contact with a liquid, said method being capable of operating continuously and efficiently.

This objective is to be achieved in accordance with the invention by a method for the removal of coatings from scrap materials, wherein the scrap is brought into contact with a liquid and, while the coating removal process is performed, moves within a conveying trough of a vibrating conveyor in a direction from the inlet end towards the outlet end of said conveying trough.

The invention is primarily based on the use of a vibrating conveyor equipped with a vibrating trough also known as oscillating trough within which the removal of the coatings takes place. Vibrating conveyors of such a design are mechanical handling systems usually employed for bulk materials of varying nature by means of which the medium to be transported is moved through oscillation. A typical vibrating conveyor performs for transportation an inclined upward movement in the conveying direction and back, i.e. this movement has not only a vertical component but also a horizontal element in conveying direction. In this way, the material to be transported is thrown upward and, after the vibrating conveyor has performed its return movement, falls down in an area located nearer to the outlet end of the conveying trough in conveying direction. The material to be transported enters the vibrating trough at the inlet end and in the described fashion moves "jerkily" little by little towards the outlet end as a result of the oscillations throwing it a bit up and in the direction of the outlet end. Each oscillation causes the conveyed material to be moved further by approximately the horizontal vector of the oscillation amplitude. Taking as an example an oscillation frequency of 10 to 16 Hz and a forward travel of the transported material per oscillation in the range of 5 to 10 mm this results in a conveying speed of 3 m/min and more.

However, a vibrating conveyor as it is proposed by the invention shall also cover a vibrating chute. Other than a vibrating conveyor of the type described hereinbefore a vibrating chute only performs a "to and fro" movement that is moves only in horizontal direction but has no vertical element. Accordingly, the transported material is not "thrown up" and with each oscillation performed rather slides a little bit forward in conveying direction. Each oscillatory motion initially causes the chute to be moved in conveying direction and when this movement has stopped abruptly accelerates the chute in opposite direction. Due to the inertia of the scrap the individual components each time slide a bit forward in the direction of travel. Since this operation is constantly repeated at high frequency a considerable overall movement in the direction of travel is accomplished. There are modern vibrating conveyors that even enable oscillation parameters to be precisely determined so that an oscillation with or without vertical element can be selected and frequency, momentum, angle etc. set as appropriate.

The conveying trough of a vibrating conveyor for the main part comprises a largely flat bottom and lateral limiting elements extending in longitudinal direction. Furthermore, the material to be transported is fed into the conveying trough at one end (the inlet end) and moved to the other end (the outlet end) in conveying direction. Wherever reference is made herein to the longitudinal direction of the vibrating conveyor this shall always be understood as the conveying direction while the term "lateral" thus denotes the direction orthogonal to the longitudinal direction.

Vibrating conveyors are of robust design and only require little maintenance. In contrast to other handling systems they relatively seldom suffer jamming or clogging disturbances since the vibratory movement usually enables the conveyors to inherently clear away faults of this nature.

So far vibrating conveyors have exclusively been used for the handling of materials while a conversion or transformation within the vibrating conveyor itself did not form part of the prior art. The invention, therefore, is based on the underlying idea that a device hitherto exclusively intended for the transportation of material is now employed to accomplish said conversion or transformation.

This offers various advantages. The method can be implemented on a continuous basis because the scrap to be treated is both transported and at the same time converted with liquid. Therefore, the period of contact between scrap and liquid is also largely predetermined because the scrap material needs a certain time for its travel from the inlet end to the outlet end, said time of travel depending on the length of the vibrating conveyor, the vibrating frequency, and momentum per oscillation. Controlling the time of contact between scrap and liquid while the dezincing of steel scrap material is performed by means of sulfuric acid for example enables the undesirable iron dissolution to be kept within acceptable limits. At the same time, by making use of a vibrating conveyor a continuous relative movement between scrap and liquid is brought about which further improves the removal of the coating. In addition, a higher scrap bed height can be provided on the conveyor because as a result of using a vibrating conveyor all the scrap items covered by other scrap components are also brought into contact with the liquid due to the movements produced. The oscillations shall preferably have a vertical element, i.e. in the conveying direction as well as upward and back, since the scrap component throwing effect accomplished in this way results in changes of position and produces particularly strong relative movements. Moreover, wear of the vibrating trough itself is reduced because the sliding friction can be minimized due to the constantly performed throwing movements.

In particular, the invention relates but shall not at all be limited to the removal of coatings from steel scrap materials. As initially mentioned above, the removal of zinc layers serving as a protection against corrosion is of particularly great economic importance for steel scrap materials. On the one hand, in the industrial field of automotive engineering for example considerable amounts of galvanized/zinc-coated steel scrap are produced while the steel and foundry industry at the same time needs for scrap recycling purposes scrap material that has been completely or almost completely dezinced. It is also to be borne in mind that zinc is a valuable metal the recovery of which not only offers a significant economic potential but furthermore is also desirable with a view to environmental protection aspects and saving resources.

The coating can be removed with the aid of an acidic aqueous solution, with the use of sulfuric acid being preferable. However, it is of course also possible to use the invention within the framework of a method that operates with an alkaline-aqueous solution. Furthermore, also organic solvents may be used as liquids to be used for the removal of the coating, for example agents intended for the removal of varnishes or similar coats.

In accordance with an especially preferred embodiment of the invention the scrap material is sprayed with the liquid while the coating removal process is performed. For this purpose nozzles of special design are employed that may in particular be arranged above the vibrating conveyor filled with scrap material. The scrap may also be spray-treated from other sides, for example from below. Spray jet angle, jet pressure, liquid volume etc. should be adjusted such that the scrap components will come into contact with the liquid from all sides to enable the coating to be removed from the entire scrap material surface. The spray coverage of the entire surface is improved by the scrap components constantly changing position during the vibrating operation ultimately resulting in the whole surface being subjected to the spray treatment. Additionally, the dezincing process is assisted through the dynamic force of the liquid jet itself. Especially when the zinc layers detach from the scrap hydrogen bubbles form on the surface of the steel scrap material to be treated, said bubbles normally impeding zinc to be removed further. Spraying liquid onto the steel scrap now results in said hydrogen bubbles to be removed from the surface more quickly so that the zinc coating removal is no longer impaired. The impairment of the removal of a coating due to the formation of bubbles on the surface is also known as Leidenfrost effect.

In the event the scrap is subjected to a spray treatment with liquid the inlet end is usually enclosed and provided with a liquid-proof barrier whereas the outlet end of the conveying trough is designed so as to be open. Alternatively, both ends may be of open design, however. The scrap can thus be fed onto the conveying trough at the inlet end and then drops from the trough by itself as soon as it has reached the outlet end. The speed of conveying the scrap in the conveying direction, the volume of liquid fed in, the spray jet pressure, oscillating frequency etc. have to be appropriately adjusted such that the coating of the scrap has almost completely been removed when the scrap reaches the outlet end. Moreover, liquid also accumulates on the bottom of the conveying trough, said liquid will additionally serve to wet scrap components or particles, in particular from the underside as well. This additional wetting effect will favorably influence the coating removal process.

The liquid used for the removal of the coating from the scrap should be intercepted. On the one hand, the liquid exits the conveying trough at the outlet end, provided it is of open design. Also conceivable in this context is to provide passages in the bottom of the conveying trough through which the liquid can enter a collecting vessel located below the conveying trough. The collected liquid may then be subjected to an appropriate treatment. Especially if zinc or tin layers are removed the stripped metal can be recovered by an electrolytic process.

In lieu of or together with the method of spray treating the scrap as described hereinbefore another method may be adopted as well by means of which the scrap passes through a suitable immersion bath. In this case the scrap material is immersed into the liquid during the coating removal process. The conveying trough thus contains a certain liquid volume through which the scrap material passes. It is to be borne in mind in this case that the scrap components are moved within a liquid which means one oscillating cycle causes the individual scrap fragments to be moved less far than in air. Accordingly, the vibrating frequency and/or the oscillation amplitude may have to be appropriately adjusted. The transportation velocity depends, inter alia, on the liquid volume and the viscosity of the liquid. If the scrap is passed through an immersion bath the oscillating movement of the conveying trough also leads to the relative movement between the individual scrap components or fragments and the liquid being intensified. Preventing the formation or causing the quick dissolution of hydrogen bubbles on the surface of the scrap material favorably increases the mass transfer between metal surface and liquid.

To make sure the liquid is kept inside the vibrating conveyor the inlet end and outlet end should each be provided with a liquid isolating barrier. Generally, the vibrating conveyor thus forms a flat trough or tray which accommodates the liquid and through which the scrap material is transported. The borders or skirting around the conveying trough prevent liquid from exiting. Since a liquid isolating barrier is arranged at the outlet end the scrap material cannot simply drop from the conveying trough but must be actively moved away, for example by means of magnets. For example, top-mounted/operated magnetic drums/magnetic strips can be used for this purpose. Other alternatives may of course be employed as well such as, for example, hoisting the scrap out by means of gripping devices, screens with draining means or baskets provided with openings in the bottom to allow the liquid to exit.

The liquid used for the removal of the coating from the scrap should be replaced in a controlled manner, for example by repumping. Continuous measurements may for instance be carried out to determine the concentration of metal ions dissolved from the scrap so that only such an appropriate amount of liquid need be replaced as is required to hold the metal ion concentration within desirable limits. The replaced liquid is then subjected to a recovery treatment as a rule, i.e. the dissolved metal ions are recovered in the form of metal, in particular by electrolysis.

In the event the dezincing process operates on the use of sulfuric acid zinc may also be recovered in the form of zinc sulfate. A suspension highly enriched with zinc sulfate may, for example, be used for zinc sulfate production purposes or be again employed directly in electrolytic galvanizing facilities. A precipitation of the zinc sulfate can be accomplished by cooling the mother liquor down to 10° C.

The zinc sulfate that has crystallized after the maximum zinc dissolubility in the recirculated mother liquor has been reached through concentration/temperature precipitation can be freed from the sulfuric acid solution in a centrifuge such that a free-flowing/shovelable product of zinc sulfate heptahydrate of minor residual moisture of preferably 3 to 5% is produced. It is to be understood in this context that buyers of zinc sulfate of the characteristics just described such as primary zinc smelters, zinc sulfate producers or manufacturers of flocculants on zinc basis must attach prime importance especially to the sulfate balances of their processes. An introduction of sulfate via adhering sulfuric acid is thus undesirable. To improve the product quality even more and reduce the transportation volume zinc sulfate heptahydrate may also be calcined within the plant to yield monohydrate.

The bottom of the conveying trough is usually of horizontal design which offers advantages because vibrating conveyors are primarily transporting the material in one plane only, i.e. a vibrating conveyor normally moves material in horizontal direction. However, the vibrating conveyor design may also provide for the bottom of the conveying trough to be slightly ascending in conveying direction, preferably by approx. 3 to 5 degrees. In this manner the liquid will accumulate in the front part of the vibrating conveyor as seen in conveying direction, i.e. collect towards the inlet end. If the scrap material now moves in conveying direction it will finally emerge at the top when breaking through the liquid surface. Due to the fact that the bottom of the conveying trough slightly ascends the outlet end need not necessarily be enclosed, it will rather be sufficient to arrange a liquid isolating barrier at the inlet end while the outlet end remains open. The scrap parts and fragments transported to the outlet end are thus allowed to simply drop from the conveying trough; they need not be hoisted out by means of magnets or similar means in this case. With this embodiment the scrap material first passes through the liquid and subsequently through ambient air. In the area where it is no longer moving through the liquid the scrap components may additionally be subjected to a spray treatment when additional spray nozzles are arranged for this purpose in the rear portion of the conveying trough as seen in conveying direction.

Advantageously, the inclination of the conveying trough may be provided as deemed appropriate resulting in the ascending slope of the conveying trough bottom being variable in conveying direction.

Following the removal of the coating further process steps may be performed, in particular rinsing and drying operations. In this way, any liquid still adhering to the scrap from which the coatings have been removed is eliminated and, if thought expedient, the scrap dried subsequently so that it is suitable for further utilization in steel production or foundries. Such rinsing and drying steps may also be carried out in vibrating conveyors to take advantage of the movements the equipment produces. If necessary, the scrap material can also be subjected to pretreatment in vibrating conveyors, for example if the zinc-coated scrap has additional organic coats or layers. In such a case the dezincing method may expediently be preceded by a suitable process step using pickling agents or similar removers to eliminate the organic coats.

As a rule, the vibrating conveyors employed for the method comprise a conveying trough having a flat bottom, with the conveying trough being provided with side walls. Depending on whether an immersion or spraying process is employed for the treatment with liquid additional walls may be arranged at the longitudinal trough ends. As appropriate for the required throughput capacity a vibrating conveyor suitable for the method may, for instance, be equipped with a conveying trough having a length of approx. 6 to 8 m, with its flat bottom being 1 to 2.5 m wide.

As vibrating conveyor driving systems various technical equipment may be employed such as, inter alia, unbalance drives, magnetic vibrator drives, eccentric shaft drive systems, exciter block drives, gear exciters etc.

The apparatus for performing the method may include means for adjusting the temperature enabling the liquid to be appropriately heated. For example, to accelerate the dezincing of steel scrap a sulfuric acid solution may be heated to between 40° C. and 60° C. (or higher if required) while in the case of a basic dezincing process elevated temperatures of 85° C. and higher are as a rule needed to enable dezincing to be accomplished within a reasonable time frame. During acidic dezincing the heat resulting from the dilution of concentrated sulfuric acid to a nominal concentration ranging between 15 and 35% can be utilized to reach the desired process temperature. The process can be operated autothermally to a large extent.

Depending on the product properties of the treated scrap time spans for the removal of the coatings can be suitably adjusted. For example, the respective zinc coating method (electrolytic, hot dip galvanizing, galvannealing, batch galvanizing), the thickness of the applied zinc layer and also the type of scrap pretreatment arranged upstream of dezincing are all factors to be considered for the dezincing method. Largely untreated scrap will require longer time spans until the zinc coat has been removed completely whereas a size reduction of the scrap by cutting, shredding etc. will produce additional contact surfaces and thus accelerate the removal. Moreover, when using a vibrating conveyor it is of advantage for the individual scrap components or fragments to be sized such that they can be transported without difficulty through the oscillating movement produced.

The conveying speed can also be adjusted as necessary. By appropriately adjusting the horizontal element of the oscillation the conveying speed can be reduced, for example, if this proves necessary to achieve the complete removal of the coating. For example, if scrap material hardly reduced in size is delivered in packages the treatment times will significantly increase. In this case, the horizontal conveying speed can be set to zero which causes the scrap to remain stationary for some time and prevent it from being transported towards the outlet end. Even a temporary movement counter to the conveying direction may be produced. As soon as the desired coating removal result has been reached the transport of the scrap components towards the outlet end continues.

On the other hand, the oscillation may also be controlled such that the conveying trough exclusively performs a horizontal movement without vertical element, resulting in the scrap material to be transported in forward direction only. In this case, the conveying trough performs the same movement as a vibrating chute.

Treating scrap material by means of a vibrating conveyor offers additional advantages in that the individual scrap components or fragments constantly contact each other due to the vibratory movement with relevant surfaces suffering injuries caused by sharp-edged scrap pieces. Such damage to the coating simplifies the removal because the coating more often than not is a passivation layer. Movement of the scrap pieces relative to each other is also achieved due to the speed in conveying direction differing as a result of the bed height of the transported material. The relative movement results from the different attenuation of the oscillatory excitation in conjunction with frictional phenomena differing according to the scrap bed height. As the bed height increases the displacement or shift between individual layers will thus become constantly greater causing the mean conveying speed to go down.

Especially in case of planar scrap pieces, for example new scrap material punching waste, it may be expedient to bring about a rotation of the scrap fragments around their axes so that all sides of the scrap can be uniformly wetted with liquid. For this purpose one or several steps can be arranged in the bottom of the conveying trough resulting in the level of the trough bottom to be lower at the outlet end than in the area of the inlet end. When a given piece of scrap now passes over such a step it falls down from this higher level and is thus caused to turn around its axis and as a result of this comes to rest with its opposite side being in contact with the bottom of the vibrating conveyor. This is of particular importance in the event the scrap is spray treated via nozzles from above the vibrating conveyor which will also enable all surfaces of planar scrap pieces to come into contact with treatment liquid. The height of the steps, i.e. the drop height, may differ to suit the size of the scrap pieces to be processed. Where appropriate, the vibrating conveyor may also be provided with means for a height adjustment of the steps. In case several steps are arranged in the trough this will result in the scrap pieces even turning around their axes several times.

Another way to make sure the scrap pieces move around their axes is to arrange in the conveying passage additional obstacles within the conveying trough, said obstacles causing the scrap pieces, which are moved forward by vibratory action, to turn in a certain direction. For example, raised or elevated portions which may be located on the bottom of the conveying trough ensure a scrap piece is first brought in upright position in conveying direction and then falls down on its underside. As a result of this, other surfaces of the scrap piece are exposed to the liquid.

The conveying trough of the vibrating conveyor should be provided with a lining withstanding on the one hand the mechanical loads and stresses caused by the scrap material and on the other also resists the liquid. In the event an acidic aqueous solution is used the conveying trough must be sufficiently acid resistant. Suitable materials are high-alloyed, wear-resistant steels or nickel-based alloys. Such materials also increase the electrode potential in the zinc/conveyed material/conveying trough system and thus enable the dezincing process to be additionally accelerated.

As mentioned earlier, it was found that a dezincing process operating on an acidic solution may be additionally accelerated by making use of a zinc ion-laden sulfuric acid solution. The concentration of zinc ions in the acidic solution preferably ranges between approx. 10 and 100 g/l. Optionally, a zinc solution may be employed that stems from the primary zinc production of a zinc smelter. As a result of the dezincing process the zinc ion concentration increases even more enabling a higher product yield to be achieved in the subsequent zinc recovery process by electrolysis.

It is moreover considered advantageous to carry out the dezincing process in the presence of oil, in particular drawing oil or wash oil, because the undesirable dissolution of iron can additionally be inhibited in this way. In the case of acidic dezincing the concentration of oil should range between approx. 0.1 and 3% by weight based on the steel scrap. The dezincing process itself remains practically unimpaired by the presence of oil. Following the dezincing operation, the oil, if thought expedient, may be removed by phase separation and reused. In particular with regard to the crystallization of zinc sulfate to be separated and to safeguard the quality of the product which should not contain associated organic substances the oil content should be kept low and appropriate measures to this effect should be taken.

Figure 2:
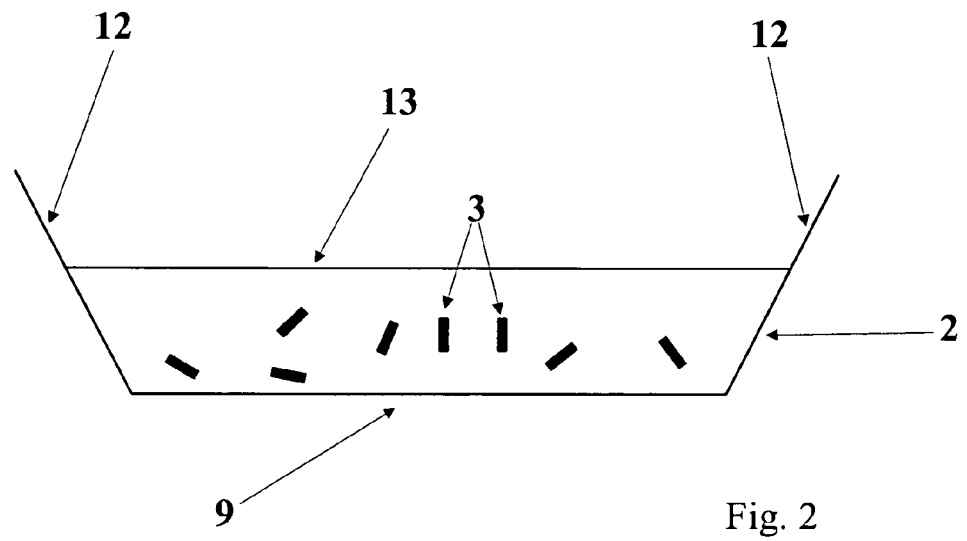
Figure 3:
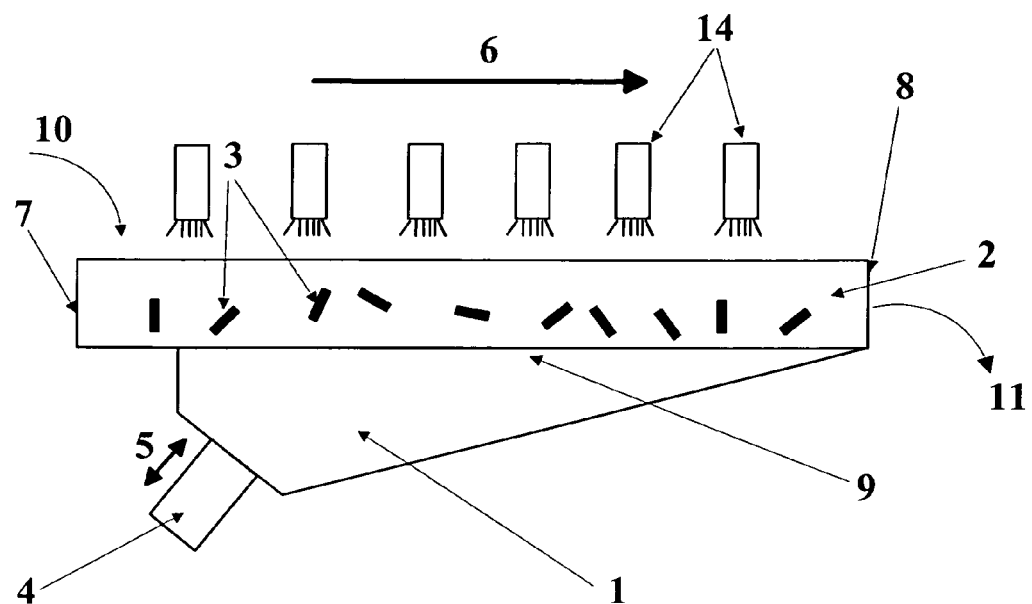
Figure 4:
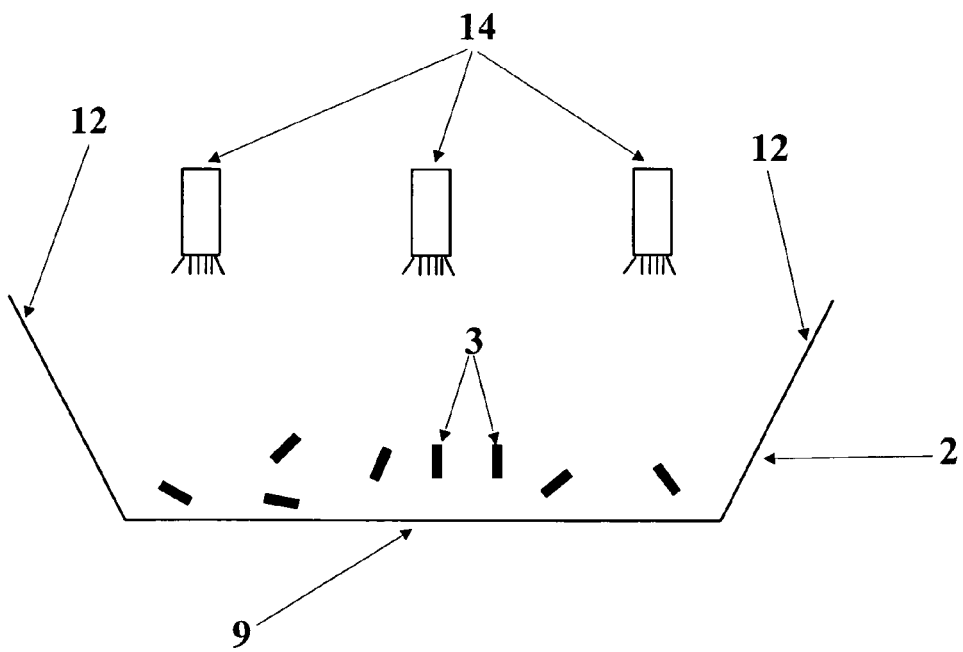
Figure 5:
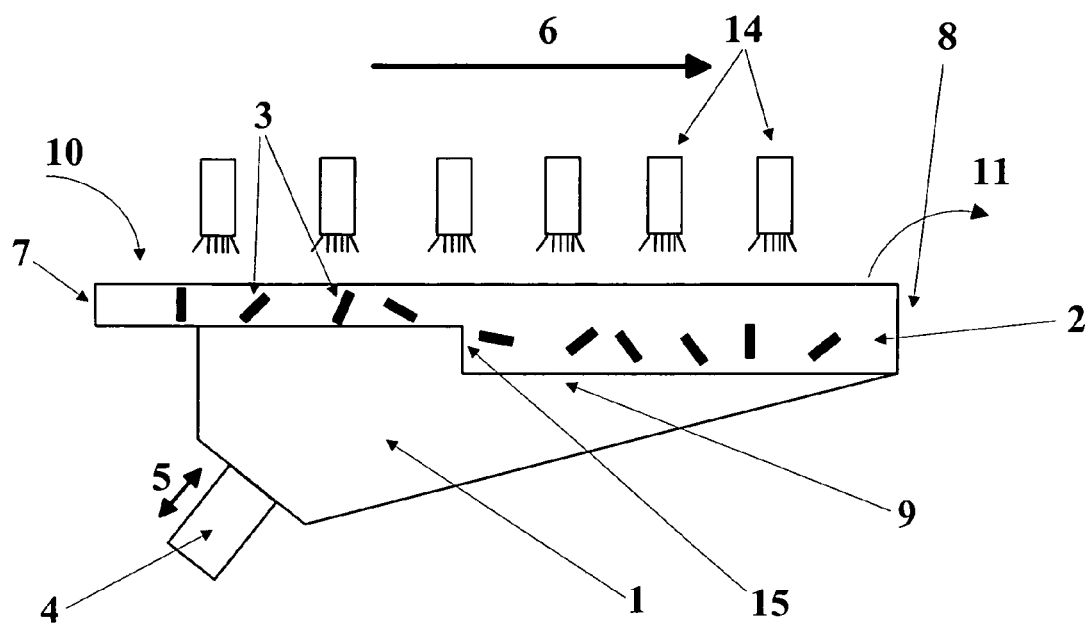

Further elucidation of the invention is provided through the enclosed figures, where FIG. 1: shows a side view of a vibrating conveyor in accordance with a first embodiment;

FIG. 2: is a front view of the conveying trough of the vibrating conveyor shown in FIG. 1;

FIG. 3: illustrates a side view of a vibrating conveyor in accordance with a second embodiment;

FIG. 4: shows a front view of the conveying trough of the vibrating conveyor shown in FIG. 3 and FIG. 5: is a side view of a vibrating conveyor in accordance with a third embodiment.

FIG. 1 illustrates schematically the implementation of the inventive method. Vibrating conveyor 1 is provided with a conveying trough 2 which accommodates the relevant scrap pieces or components 3. The vibrating conveyor 1 is driven by oscillating drive 4 producing movement in oscillating direction 5 causing the scrap pieces 3 to be thrown upward and to the right as shown in the figure so that each oscillation cycle causes them to be displaced by a certain distance to the right when falling down onto the conveying trough 2 again. Basically, this results in conveying direction 6 as illustrated in the figure by an arrow.

The conveying trough 2 has an inlet end 7 and an outlet end 8. The scrap material feeding point is symbolized by arrow 10, while arrow 11 symbolizes the discharge of scrap, for example with the aid of magnets. The bottom 9 of the conveying trough 2 is designed so as to be flat. As per this embodiment an immersion bath is provided within the conveying trough 2, said bath consisting of liquid used to remove the coating of scrap pieces 3. The scrap pieces 3 are thus transported through the liquid from the inlet end 7 to the outlet end 8. During their travel all surfaces of the pieces are brought in contact with the liquid resulting in the coating to be eliminated virtually completely. To retain the liquid inside the conveying trough 2, said trough is provided with a liquid-isolating barrier at both the inlet end 7 and the outlet end 8 resulting in the conveying trough 2 to be shaped in the form of a collecting pan or tray.

FIG. 2 illustrates a front view of the conveying trough 2 depicted in FIG. 1. Side walls 12 as well as flat bottom 9 can be seen in the figure. The individual pieces of scrap 3 are all situated below the surface of the liquid 13.

FIG. 3 depicts an alternative embodiment of the invention; however, what has been said for the first embodiment applies here as well with regard to the movement of scrap pieces 3 through the conveying trough 2. In contrast to that embodiment the scrap pieces are not located, however, below a liquid surface 13 but rather subjected to a spray treatment with liquid from above by means of nozzles 14. Since treatment in this case does not take place in an immersion bath the outlet end 8 (and, if applicable, also the inlet end) may be of open design. Accordingly and illustrated by arrow 11, the scrap pieces 3 are allowed to simply fall from the outlet end 8 of the conveying trough 2 and can then be collected downstream conveyor trough 2. FIG. 4 is a frontal view of this alternative embodiment and shows that there is no liquid surface 13 in this case.

FIG. 5 finally shows a third embodiment which basically corresponds to the embodiment described by way of FIG. 1. In contrast to that embodiment, however, a step 15 is arranged in the bottom 9. The scrap pieces 3 are moved in the conveying direction 6 over and beyond step 15 and then fall down to some extent thus causing scrap pieces 3 to turn around their axes. This enables surfaces of the scrap pieces 3 previously in downward position to be exposed to the spray jet produced by nozzles 14. This is of special significance when treating planar pieces of scrap 3.

The invention claimed is:

1. Method for the removal of coatings from scrap materials, wherein the scrap is brought into contact with a liquid by spray-treating the scrap with the liquid during the coating removal process, wherein the liquid is capable of removing the coating from the scrap, wherein the scrap, while the coating removal process is performed, moves within a conveying trough of a vibrating conveyor in a direction from an inlet end towards an outlet end of said conveying trough, the inlet end being provided with a liquid-isolating barrier and the outlet end being designed so as to be open, and wherein the bottom of the conveying trough slopes upward in the conveying direction.

2. Method according to claim 1, characterized in that the scrap material is steel scrap.

3. Method according to claim 1, characterized in that the scrap material is zinc-coated/galvanized scrap and the zinc layer is removed.

4. Method according to claim 1, characterized that the liquid is an acidic aqueous solution.

5. Method according to claim 4, characterized in that the acidic aqueous solution is a sulfuric acid solution.

6. Method according to claim 1, characterized in that the liquid is an alkaline aqueous solution.

7. Method according to claim 1, characterized in that the upward slope of the bottom of the conveying trough is 3 to 5 degrees in the conveying direction.

8. Method according to claim 1, characterized in that the bottom of the conveying trough is designed to comprise one or several steps so that the level of the bottom is lower in the area of the outlet end than in the area of the inlet end.

9. Method according to claim 1, characterized in that the bottom of the conveying trough is provided with raised or elevated portions.

* * * * *